(12) United States Patent
Sano et al.

(10) Patent No.: US 12,136,892 B2
(45) Date of Patent: Nov. 5, 2024

(54) POWER CONVERTER FOR SUPPRESSING HEAT TRANSFER TO ELECTRICAL COMPONENT

(71) Applicant: DENSO CORPORATION, Kariya (JP)

(72) Inventors: Tomohisa Sano, Kariya (JP); Yuu Yamahira, Kariya (JP)

(73) Assignee: DENSO CORPORATION, Kariya (JP)

( * ) Notice: Subject to any disclaimer, the term of this patent is extended or adjusted under 35 U.S.C. 154(b) by 274 days.

(21) Appl. No.: 17/508,589

(22) Filed: Oct. 22, 2021

(65) Prior Publication Data

US 2022/0045626 A1 Feb. 10, 2022

Related U.S. Application Data

(63) Continuation of application No. PCT/JP2020/015974, filed on Apr. 9, 2020.

(30) Foreign Application Priority Data

Apr. 26, 2019 (JP) .................. 2019-086404

(51) Int. Cl.
*H02M 7/537* (2006.01)
*H02M 7/00* (2006.01)
*E03D 11/06* (2006.01)

(52) U.S. Cl.
CPC ........... *H02M 7/537* (2013.01); *H02M 7/003* (2013.01); *E03D 11/06* (2013.01)

(58) Field of Classification Search
CPC ......... H02M 7/48; H02M 7/003; H02M 7/537
See application file for complete search history.

(56) References Cited

U.S. PATENT DOCUMENTS

| | | | |
|---|---|---|---|
| 2011/0181105 A1* | 7/2011 | Michinaka | H05K 7/1432 307/9.1 |
| 2012/0300521 A1* | 11/2012 | Hida | H05K 7/14329 363/131 |
| 2013/0121052 A1* | 5/2013 | Yamaura | H02M 7/162 363/131 |
| 2014/0153189 A1* | 6/2014 | Okamura | H02M 7/003 361/688 |
| 2017/0085209 A1* | 3/2017 | Dede | H02M 1/32 |
| 2018/0013355 A1* | 1/2018 | Tokuyama | H01L 25/18 |
| 2018/0358903 A1* | 12/2018 | Takahashi | H02M 7/003 |
| 2019/0013744 A1* | 1/2019 | Mochiki | H02P 27/06 |

FOREIGN PATENT DOCUMENTS

JP    2014-45035 A    3/2014

* cited by examiner

*Primary Examiner* — Gustavo A Rosario-Benitez
(74) *Attorney, Agent, or Firm* — Oliff PLC

(57) ABSTRACT

In a power converter, each of a positive busbar and a negative busbar includes a first current path that has a first thermal resistance and is a current flow path between a power-source connection terminal and at least one terminal connection portion, and a second current path that has a second thermal resistance and is a current flow path between the power-source connection terminal and an element connection portion. The first thermal resistance of the first current path of at least one of the positive busbar and the negative busbar is lower than the second thermal resistance of the second current path of the at least one of the positive busbar and the negative busbar.

9 Claims, 10 Drawing Sheets

POWER CONVERTER FOR SUPPRESSING HEAT TRANSFER TO ELECTRICAL COMPONENT

CROSS-REFERENCE TO RELATED APPLICATION

The present application is a bypass continuation application of currently pending international application No. PCT/JP2020/15974 filed on Apr. 9, 2020 designating the United States of America, the entire disclosure of which is incorporated herein by reference.

The present application is based on and claims the benefit of priority from Japanese Patent Application No. 2019-86404 filed on Apr. 26, 2019, the disclosure of which is incorporated in its entirety herein by reference.

TECHNICAL FIELD

The present disclosure relates to power converters.

BACKGROUND

Typical power converters, such as inverters, include semiconductor modules, capacitor elements, and busbars. Each busbar electrically connects between the semiconductor modules and the capacitor elements.

SUMMARY

A power converter according to one aspect of the present disclosure includes a positive busbar and a negative busbar. Each of the positive busbar and the negative busbar includes a power-source connection portion electrically connected to a direct-current power source, an element connection portion electrically connected to a capacitor element, and at least one terminal connection portion electrically connected to a power terminal of at least one semiconductor module. Each of the positive busbar and the negative busbar includes a first current path that has a first thermal resistance and is a current flow path between the power-source connection terminal and the at least one terminal connection portion, and a second current path that has a second thermal resistance and is a current flow path between the power-source connection terminal and the element connection portion. The first thermal resistance of the first current path of at least one of the positive busbar and the negative busbar is lower than the second thermal resistance of the second current path of the at least one of the positive busbar and the negative busbar.

BRIEF DESCRIPTION OF THE DRAWINGS

The above-described object, and other objects, features, or beneficial advantages in the present disclosure will be apparent from the following description of embodiments with reference to the accompanying drawings in which.

DETAILED DESCRIPTION OF EMBODIMENTS

Figure 1:
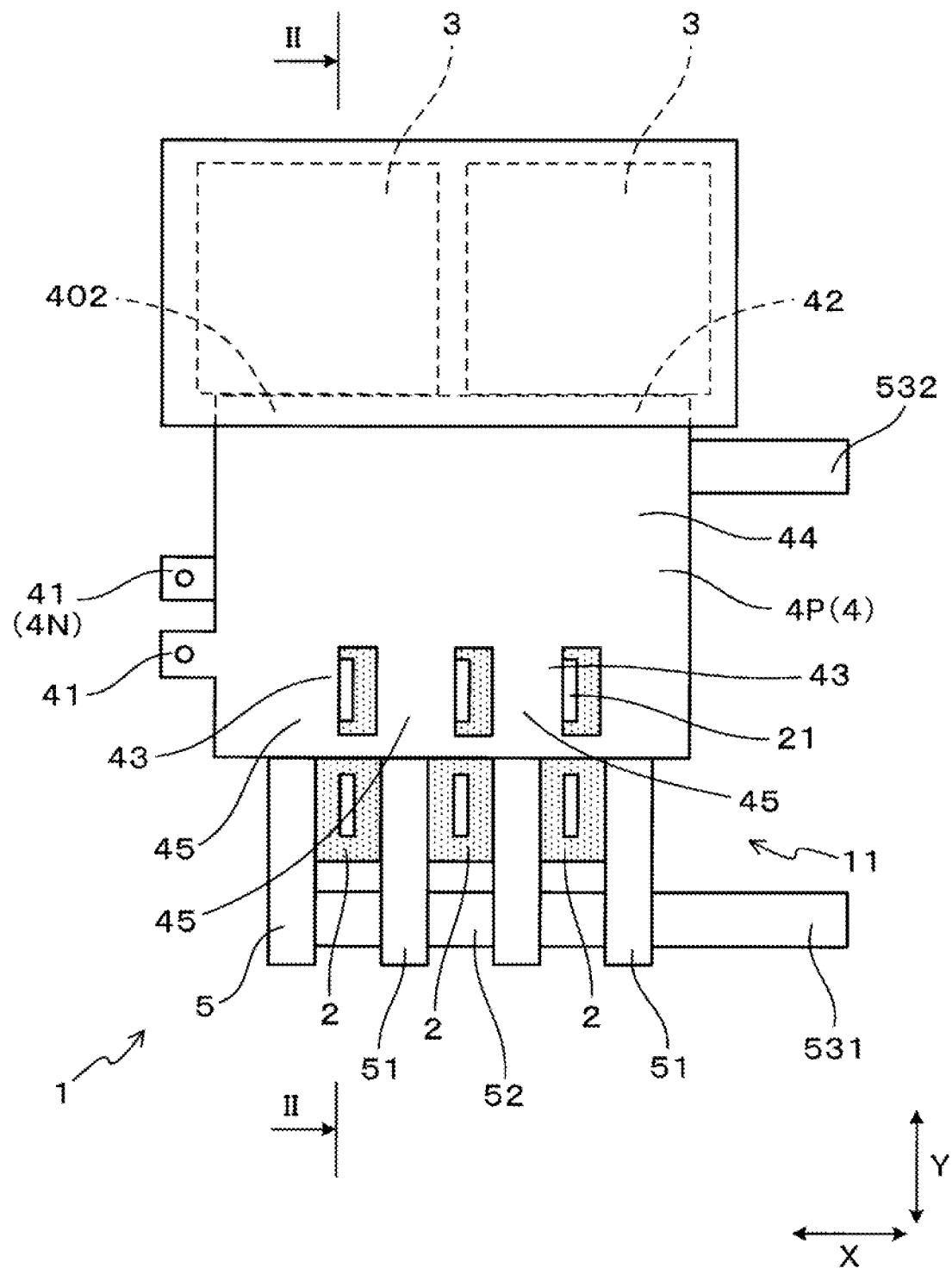
FIG. 1 is a structural view of a power converter according to the first embodiment.

Typical power converters, such as inverters, one of which is disclosed in Japan Patent Application Publication No. 2000-30748, include semiconductor modules, capacitor elements, and busbars. Each busbar electrically connects between the semiconductor modules and the capacitor elements.

A capacitor device of a power converter disclosed in the patent publication includes the capacitor elements and the busbars, and each of the capacitor elements is electrically connected to the respective semiconductor modules via the busbars and also connected to a direct-current (DC) power source via the busbars.

Heat generated in the busbars of the power converter disclosed in the patent publication may be likely to have an influence on the capacitor elements.

A direct current supplied from the DC power source hardly flows through the capacitor elements, while alternating-current (AC) components, such as ripples, contained in the direct current, flow therethrough. This results in the AC components mainly contributing to an increase in temperature of the capacitor elements due to heat generated therefrom.

Unfortunately, an increase in the direct current flowing through a conductive path of each busbar, which is arranged between the semiconductor modules and the DC power source, may increase the amount of heat generated from the conductive path of the corresponding busbar. The heat generated from the conductive path of each busbar may have a risk of being transferred to the capacitor elements via the corresponding busbar.

In particular, a higher electric resistance through the conductive path of each busbar may become a larger amount of heat generated from the path of the corresponding busbar, resulting in an increase in the occurrence of the risk. Additionally, a lower thermal resistance through the conductive path of each busbar may cause the heat generated from the path of the corresponding busbar to be more transferable to the capacitor elements, making it difficult to prevent an increase in temperature of each capacitor element.

From these viewpoints, the present disclosure aims to provide power converters, each of which is capable of preventing an increase in temperature of a capacitor element.

An exemplary measure for solving the above problem provides a power converter. The power converter includes at least one semiconductor module that has a power terminal and is electrically connected to a direct-current power source, and a capacitor element electrically connected to the at least one semiconductor module. The power converter includes a positive busbar arranged to electrically connect between the direct-current power source and the at least one semiconductor module, and a negative busbar arranged to electrically connect between the direct-current power source and the at least one semiconductor module. The power converter includes a cooling unit configured to cool the at least one semiconductor module.

Each of the positive busbar and the negative busbar includes a power-source connection portion electrically connected to the direct-current power source, an element connection portion electrically connected to the capacitor element, and at least one terminal connection portion electrically connected to the power terminal of the at least one semiconductor module. Each of the positive busbar and the negative busbar includes a first current path that has a first thermal resistance and is a current flow path between the power-source connection terminal and the at least one terminal connection portion, and a second current path that has a second thermal resistance and is a current flow path between the power-source connection terminal and the element connection portion. The first thermal resistance of the first current path of at least one of the positive busbar and the negative busbar is lower than the second thermal resistance of the second current path of the at least one of the positive busbar and the negative busbar.

As described above, the power converter of the exemplary measure includes the first current path with the first thermal resistance that is lower than the second thermal resistance of the second current path. This results in the first current path having an electrical resistance that is lower than that of the second current path. This therefore enables the amount of heat generated due to a direct current flowing through the first current path to be reduced.

Additionally, the second thermal resistance of the second current path being higher than the first thermal resistance of the first current path enables the amount of heat transferred from the first current path to the capacitor element to be reduced, resulting in an increase in temperature of the capacitor element being suppressed or restricted.

As described above, the present disclosure offers a power converter that suppresses an increase in temperature of a capacitor element.

The following describes embodiments of the present disclosure with reference to the accompanying drawings.

First Embodiment

The following describes the first embodiment of the present disclosure with reference to FIGS. 1 to 8.

Figure 2:
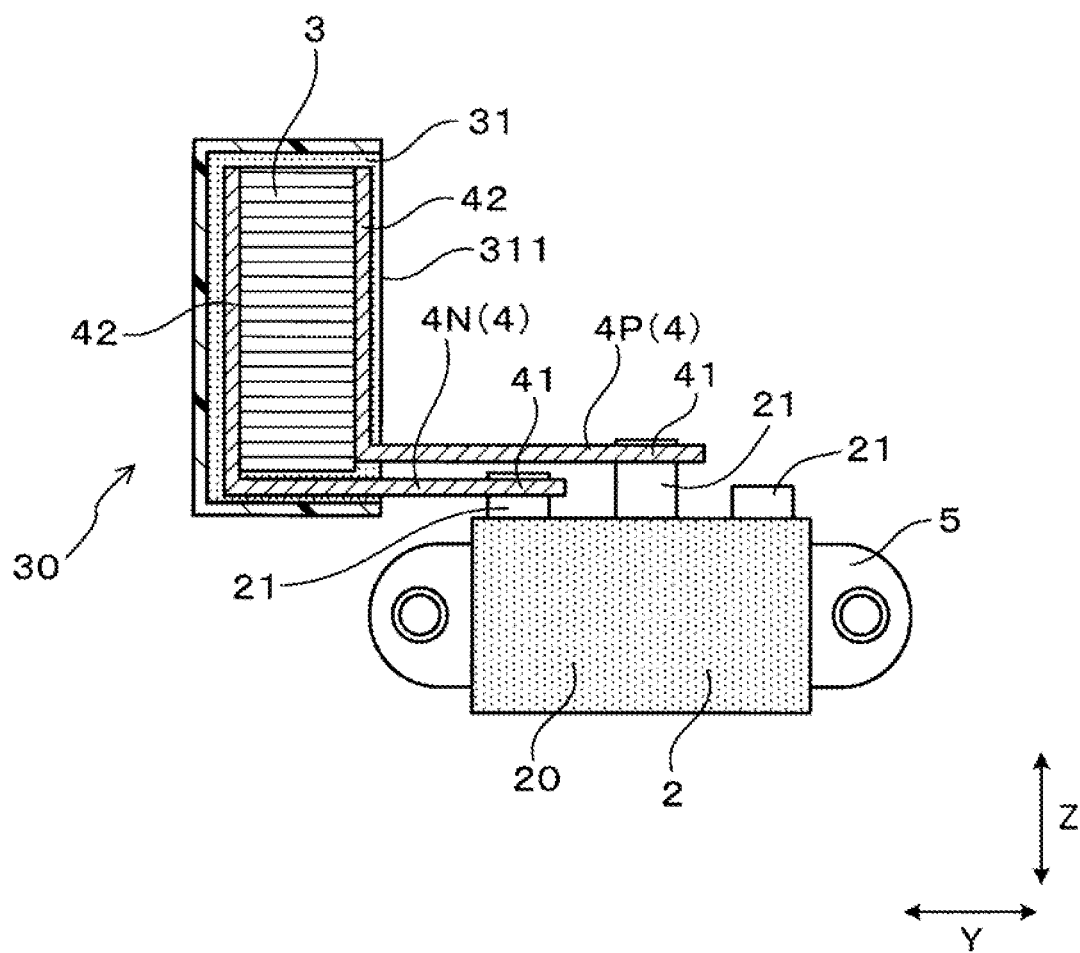
FIG. 2 is a cross-sectional view taken along line II-II of FIG. 1.
Figure 3:
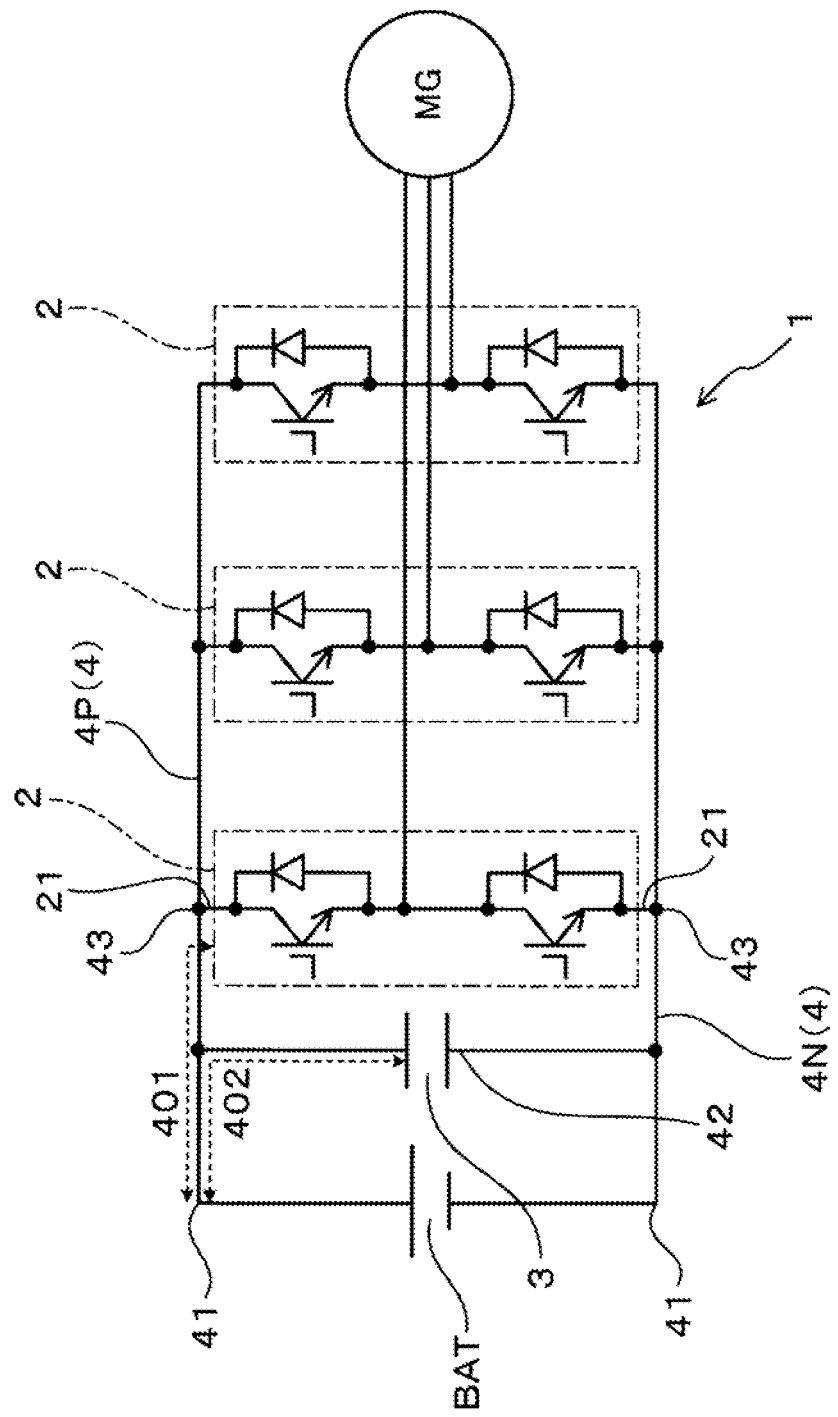
FIG. 3 is a circuit diagram of the power converter according to the first embodiment.

A power converter 1 of the first embodiment includes, as illustrated in FIGS. 1 to 3, semiconductor modules 2, capacitor elements 3, a positive busbar 4P, a negative busbar 4N, and a cooler mechanism 5.

Each semiconductor module 2 is electrically connected to a DC power source BAT. Each capacitor element 3 is electrically connected to the respective semiconductor modules 2. The positive busbar 4P electrically connects among the DC power source BAT, the semiconductor modules 2, and the capacitor elements 3 to one another. Similarly, the negative busbar 4N electrically connects among the DC power source BAT, the semiconductor modules 2, and the capacitor elements 3 to one another.

Figure 4:
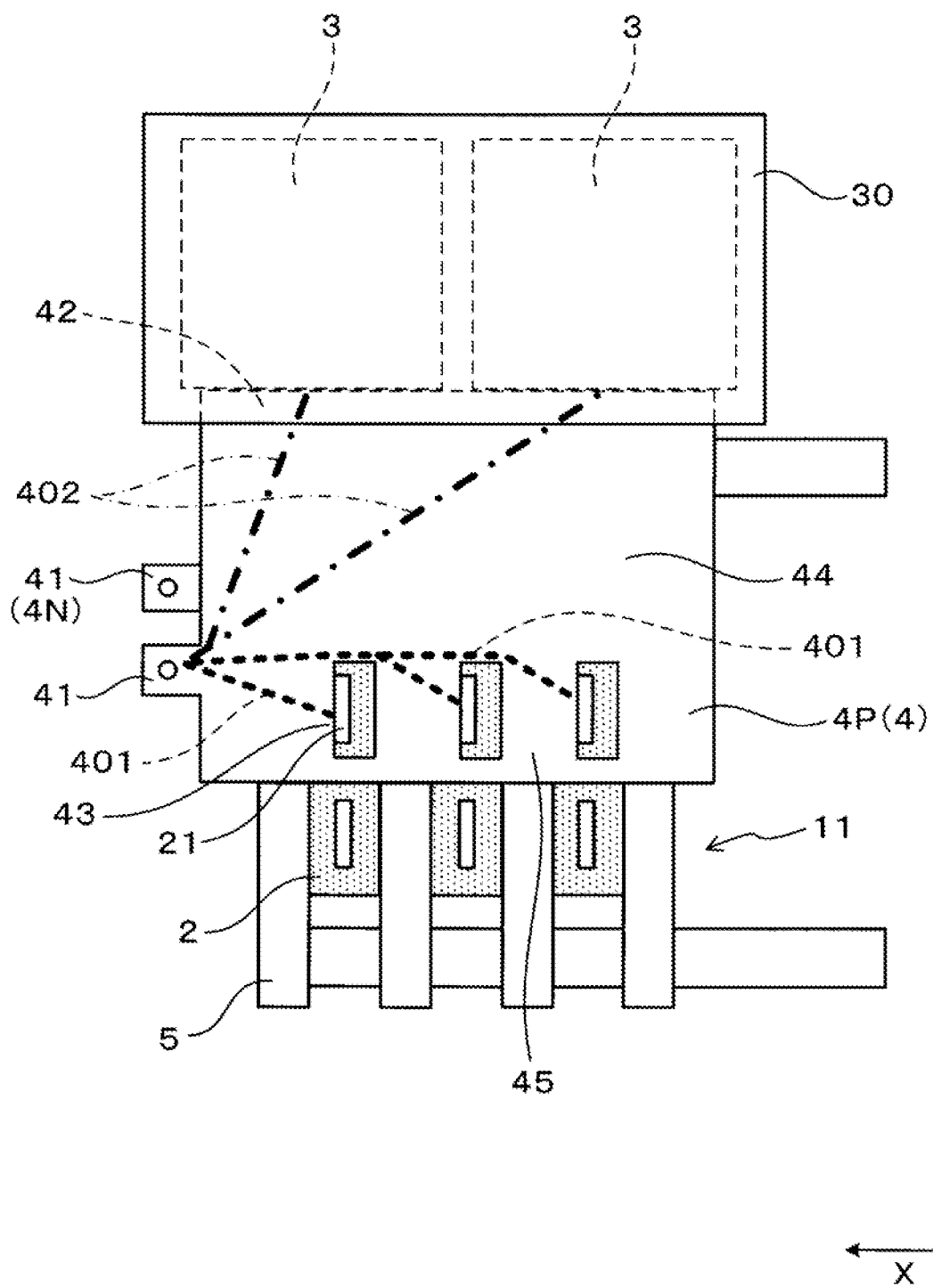
FIG. 4 is a structural view of the power converter according to the first embodiment, which illustrates current paths.

As illustrated in FIGS. 1 and 4, each of the positive and negative busbars 4P and 4N is comprised of a power-source connector 41, an element connection portion 42, terminal connection portions 43, first current paths 401, and second current paths 402.

Each semiconductor module 2 has three power terminals 21 that include a positive power terminal 21, a negative power terminal 21, and an output power terminal 21.

Each of the capacitor elements has a positive electrode and a negative electrode.

The power-source connection portion 41 of each of the busbars 4P and 4N is electrically connected to the DC power source BAT. The element connection portion 42, i.e., the positive element connection portion 42, of the positive busbar 4P is electrically connected to the positive electrodes of the respective capacitor elements 3. The element connection portion 42, i.e., the negative element connection portion 42, of the negative busbar 4N is electrically connected to the negative electrodes of the respective capacitor elements 3.

The terminal connection portions 43 of the positive busbar 4P are electrically connected to the positive power terminals 21 of the respective semiconductor modules 2, and the terminal connection portions 43 of the negative busbar 4N are electrically connected to the negative power terminals 21 of the respective semiconductor modules 2.

As illustrated in FIG. 4, each first current path 401 of the positive busbar 4P serves as a current-flow path between the power-source connection portion 41 and a corresponding one of the terminal connection portions 43 respectively connected to the positive power terminals 21 of the semiconductor modules 2. Similarly, each first current path 401 of the negative busbar 4N serves as a current-flow path between the power-source connection portion 41 and a corresponding one of the terminal connection portions 43 respectively connected to the negative power terminals 21 of the semiconductor modules 2.

Additionally, each second current path 402 of the positive busbar 4P serves as a current-flow path between the power-source connection portion 41 and the positive element connection portion 42 connected to the positive electrodes of the respective capacitors 3. Similarly, each second current path 402 of the negative busbar 4N serves as a current-flow path between the power-source connection portion 41 and the negative element connection portion 42 connected to the negative electrodes of the respective capacitors 3.

At least one first current path 401 of at least one of the positive busbar 4P and the negative busbar 4N has a thermal resistance lower than a thermal resistance of any of the second current paths 402 of the positive and negative busbars 4P and 4N. For example, one of the first current paths 401 of the positive busbar 4P, which connects between the power-source connection portion 41 and the leftmost terminal connection portion 43 in FIG. 4, has a lower thermal resistance than any of the second current paths 402 of the positive and negative busbars 4P and 4N. This therefore results in an electrical resistance of the lower thermal-resistance first current path 401 having a lower electrical resistance than any of the second current paths 402 of the positive and negative busbars 4P and 4N.

As described above, the thermal resistance of each of the positive busbar 4P and negative busbar 4N is proportional to the electrical resistance of the corresponding one of the positive busbar 4P and negative busbar 4N. This results in, the higher the thermal resistance of each of the positive busbar 4P and negative busbar 4N, the higher the electrical resistance of the corresponding one of the positive busbar 4P and negative busbar 4N. Similarly, this results in, the lower the thermal resistance of each of the positive busbar 4P and negative busbar 4N, the lower the electrical resistance of the corresponding one of the positive busbar 4P and negative busbar 4N.

Each of the first and second current paths 401 and 402 included in each of the positive and negative busbars 4P and 4N actually has a certain amount of margin. That is, each of the first and second current paths 401 and 402 included in each of the positive and negative busbars 4P and 4N has an identifiable higher current density. This enables the thermal resistance and the electrical resistance of each of the first and second current paths 401 and 402 to be compared with those of another of the first and second current paths 401 and 402.

Additionally, at least one first current path 401 of at least one of the positive busbar 4P and the negative busbar 4N has a length shorter than a length of any of the second current paths 402 of the positive and negative busbars 4P and 4N. For example, one of the first current paths 401 of the positive busbar 4P, which connects between the power-source connection portion 41 and the leftmost terminal connection portion 43 in FIG. 4, has a shorter length than any of the second current paths 402 of the positive and negative busbars 4P and 4N.

Hereinafter, the following also describes the positive busbar 4P or the negative busbar 4N commonly as a busbar 4 when describing the common information about the positive and negative busbars 4P and 4N.

Figure 5:
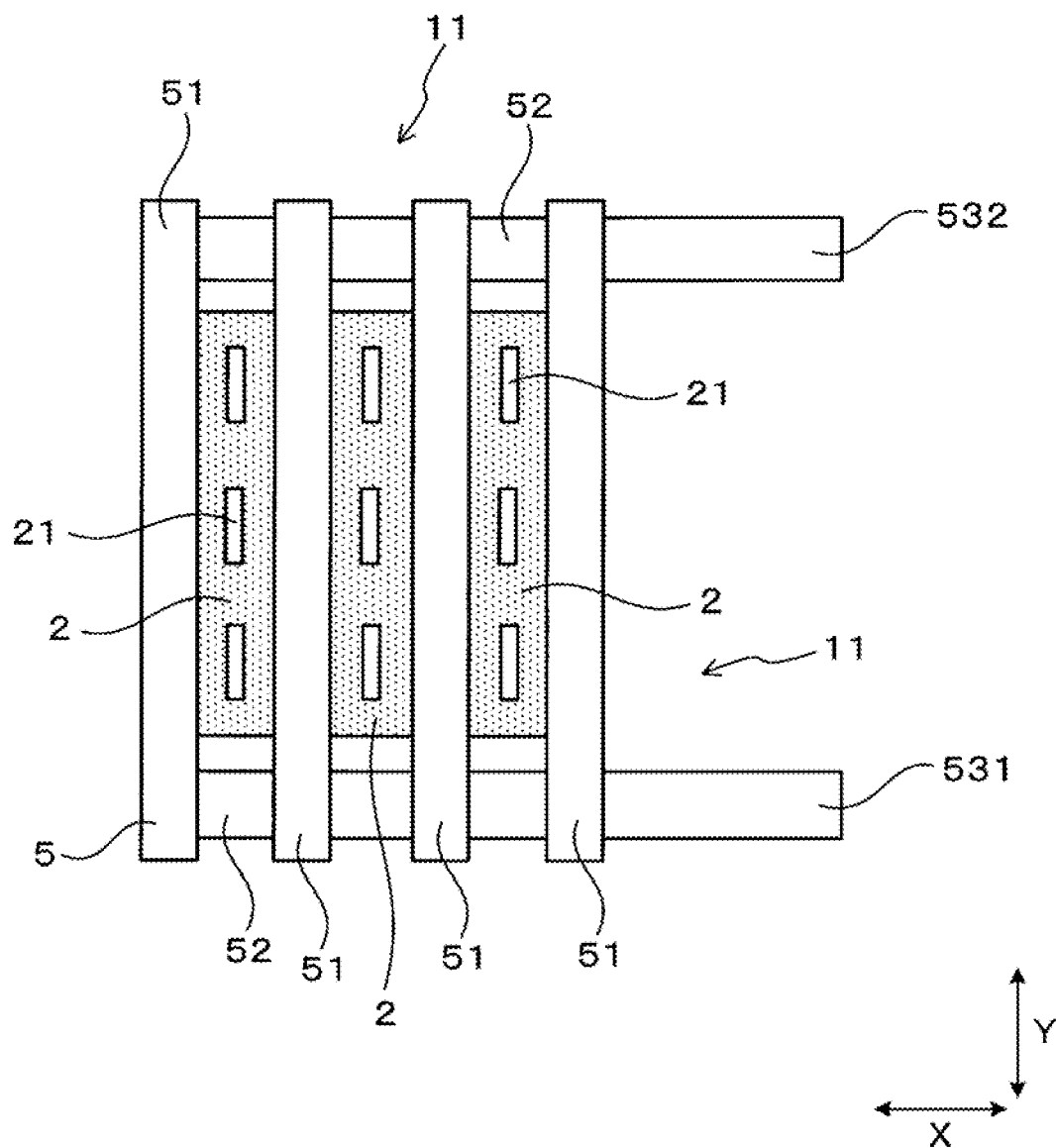
FIG. 5 is a plan view of a semiconductor stack and a cooling unit according to the first embodiment.

As illustrated in FIG. 5, the power converter 1 of the first embodiment is configured such that the semiconductor modules 2 are stacked in a predetermined direction, i.e., a stack direction, X to constitute a semiconductor stack 11. The capacitor elements 3 are disposed to be adjacent to the semiconductor stack 11 in a lateral direction Y perpendicular to the stack direction X.

Figure 6:
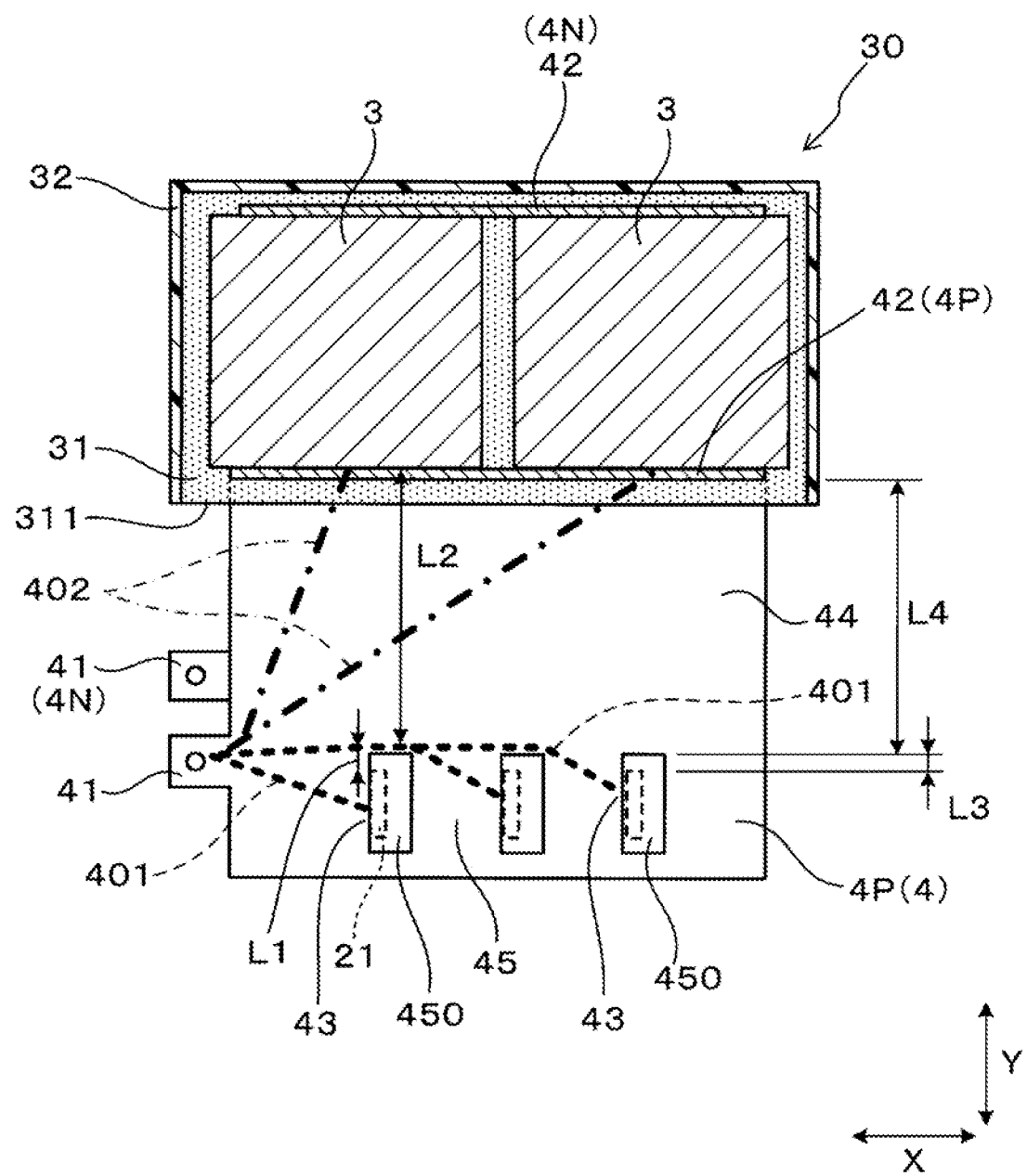
FIG. 6 is a partially cross-sectional view illustrating a positive busbar of the power converter according to the first embodiment.
Figure 7:
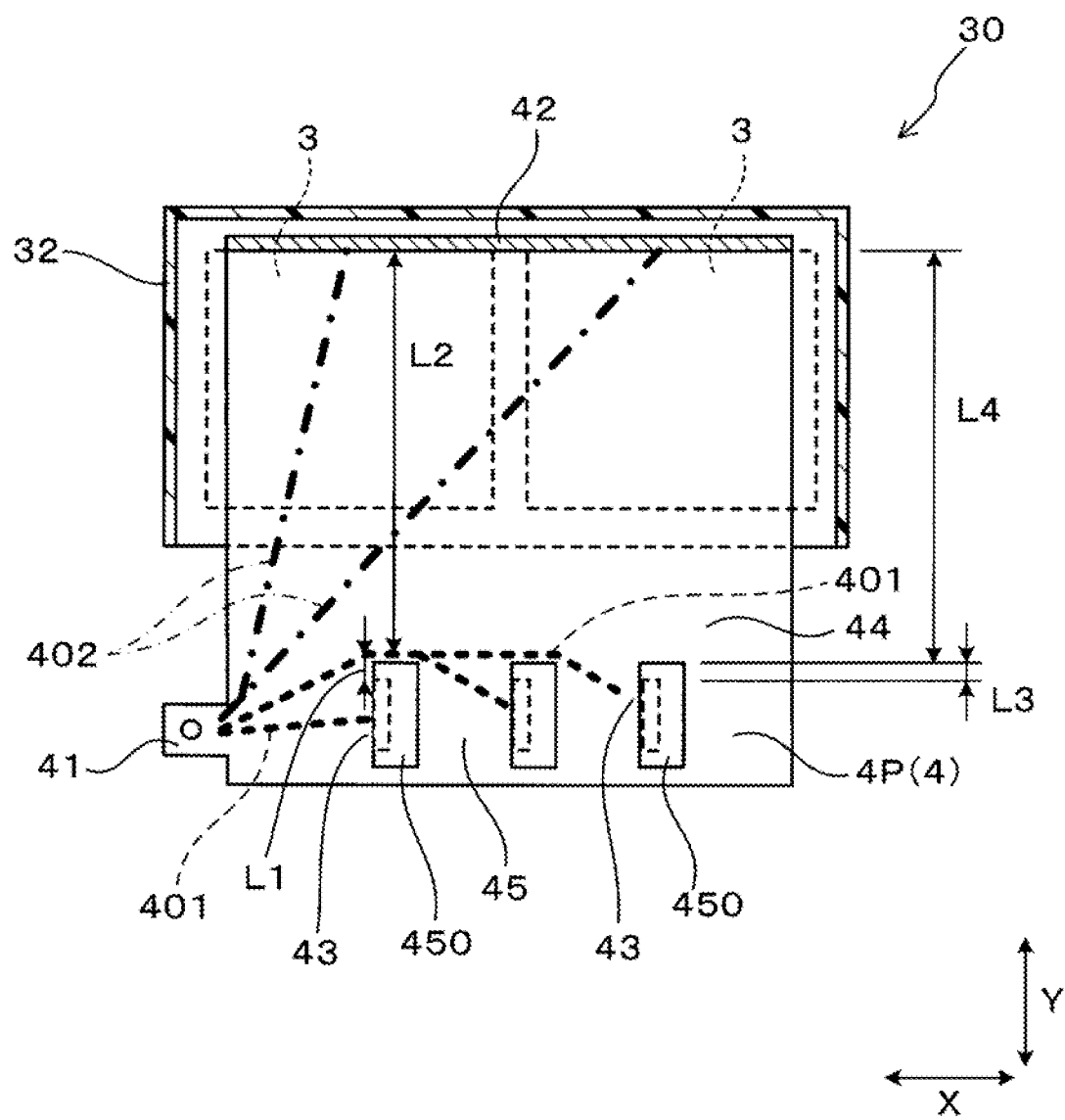
FIG. 7 is a partially cross-sectional view illustrating a negative busbar of the power converter according to the first embodiment.
Figure 8:
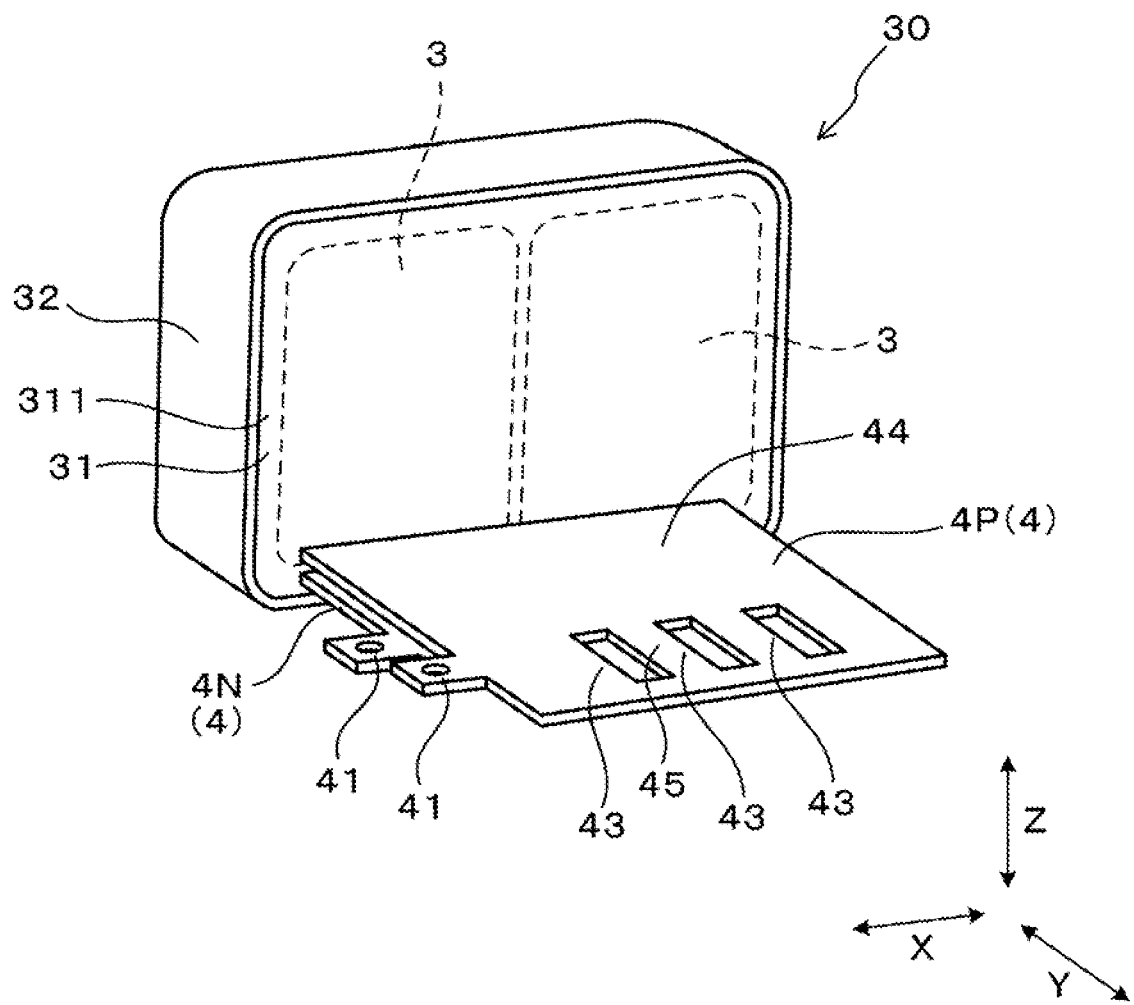
FIG. 8 is a perspective view of a capacitor module of the power converter according to the first embodiment.

Each of the positive and negative busbars 4P and 4N is comprised of, as illustrated in FIGS. 6 to 8, a common portion 44 that constitutes a part of the first current paths 401 and a part of the second current paths 402 of the corresponding one of the positive and negative busbars 4P and 4N. Each of the positive and negative busbars 4P and 4N is also comprised of branch portions 45 that branches off from the common portion 44 thereof; each of the branch portions 45 includes a corresponding one of the terminal connection portions 43.

The common portion 44 of each of the positive busbar 4P and the negative busbar 4N includes one of the first current paths 401; the one of the first current paths 401 will be referred to as a reference first current path 401.

At least one of the positive busbar 4P and the negative busbar 4N has a distance L1 of each of the terminal connection portions 43 from the reference first current path 401 in the lateral direction Y, and has a distance L2 of the positive terminal connector 42 from the reference first current path 401 in the lateral direction Y; the distance L1 is set to be shorter than the distance L2.

Each of the positive busbar 4P and the negative busbar 4N according to the first embodiment is configured such that the distance L1 of each of the terminal connection portions 43 from the reference first current path 401 in the lateral direction Y is set to be shorter than the distance L2 of the positive terminal connector 42 from the reference first current path 401 in the lateral direction Y.

As illustrated in FIGS. 6 and 7, the reference first current path 401 is located in the common portion 44 of each of the positive and negative busbars 4P and 4N to extend while passing through boundaries of the branch portions 45 and the common portion 44. The location of the reference first current path 401 is closer to the terminal connection portions 43 than to the positive terminal connector 42 in the lateral direction Y.

Hereinafter, the stack direction X will also be referred to simply as an X direction, and the lateral direction Y will also be referred to simply as a Y direction. Additionally, a direction perpendicular to both the X direction and Y direction will be referred to as a Z direction. As described later, the power terminals 21 of each semiconductor module 2 protrude in the Z direction.

As illustrated in FIGS. 1 and 2, each semiconductor module 2 according to the first embodiment is comprised of a module package 20 that incorporates therein a pair of upper- and lower-arm switching devices each comprised of an Insulated Gate Bipolar Transistor (IGBT), a Metal-Oxide Semiconductor Field-Effect Transistor (MOSFET), or another type of a switch; the upper- and lower-arm switching devices is connected in series to constitute a series switch section.

Each semiconductor module 2 is also comprised of the three power terminals 21, i.e., the positive power terminal 21, the negative power terminal 21, and the output power terminal 21, protruding from the module package 20 in the Z direction. As described above, the positive power terminal 21 is connected to the positive busbar 4P, the negative power terminal 21 is connected to the negative busbar 4N, and the output busbar 21 is connected to an unillustrated output busbar.

The power converter 1 includes a capacitor module 30 comprised of the capacitor elements 3, a seal resin filler (seal resin package) 31, and a capacitor case 32 that has an opening surface. The capacitor elements 3, which are connected to each other by the positive element connection portion 42 and the negative element connection portion 42 as a capacitor assembly, are disposed in the capacitor case 32, and the seal resin filler 31 is sealed in the capacitor case 32, so that the capacitor assembly is encapsulated in the seal resin filler 31. A part of the positive busbar 4P connected to the positive element connection portion 42 is also encapsulated in the seal resin filler 31, and a part of the negative busbar 4N connected to the negative element connection portion 42 is further encapsulated in the seal resin filler 31.

This results in the capacitor assembly, the sealing resin member 31, the part of the positive busbar 4P, and the part of the negative busbar 4N being integrally modulated with one another, so that the capacitor module 30 is constructed (see FIGS. 6 and 8).

As described above, the part of each of the positive busbar 4P and the negative busbar 4N is encapsulated in the seal resin filler 31 filled in the capacitor case 32 according to the first embodiment.

Additionally, a remaining part of each of the positive busbar 4P and the negative busbar 4N is exposed from the seal resin filler 31. This results in the whole of each of the first current paths 401 of each of the positive busbar 4P and the negative busbar 4N being exposed from the seal resin filler 31.

As illustrated in each of FIGS. 2, 6, 7, and 8, the seal resin filler 31 has a potting surface 311, which corresponds to the opening surface of the capacitor case 32, directed toward one side of the Y direction, and is exposed from the capacitor case 32. Each of the positive and negative busbars 4P and 4N extends from the corresponding one of the positive and negative element connectors 42 filled in the seal resin filler 31 through the potting surface 311 toward the one side of the Y direction. The extending portion of each of the positive and negative busbars 4P and 4N exposed from the potting surface 311 of the seal resin filler 31 is located to face the Z direction.

As illustrated in FIG. 2, the extending portion of the positive busbar 4P and that of the negative busbar 4N are arranged with a predetermined clearance therebetween in the Z direction that corresponds to a thickness direction of each of the busbars 4P and 4N. An end of the extending portion of the positive busbar 4P is located to be farther from the potting surface 311 than that of the extending portion of the positive busbar 4P is. The relationship between the extending length of the positive busbar 4P in the Y direction and the extending length of the negative busbar 4N in the Y direction is not limited thereto. Specifically, the extending length of the negative busbar 4N in the Y direction may be longer than that of the positive busbar 4P in the Y direction.

As illustrated in FIGS. 6 and 7, each of the positive and negative busbars 4P and 4N has three through holes 450 formed through the extending end thereof in the Z direction and arranged at intervals in the X direction. Each of the positive and negative busbars 4P and 4N is comprised of the branch portions 45 that are separated by the respective through holes 450 in the X direction.

Each of the three through holes 450 of the positive busbar 4P has an inner peripheral edge. Through each of the three through holes 450 of the positive busbar 4P, a corresponding one of the positive power terminals 21 of the respective semiconductor modules 2 protrudes. A part of the inner peripheral edge of each of the three through holes 450 of the positive busbar 4P serves as a corresponding one of the terminal connection portions 43 to which a corresponding one of the positive power terminals 21 of the respective semiconductor modules 21 is joined.

Similarly, each of the three through holes 450 of the negative busbar 4N has an inner peripheral edge. Through each of the three through holes 450 of the negative busbar 4N, a corresponding one of the negative power terminals 21 of the respective semiconductor modules 2 protrudes. A part of the inner peripheral edge of each of the three through holes 450 of the negative busbar 4N serves as a corresponding one of the terminal connection portions 43 to which a corresponding one of the negative power terminals 21 of the respective semiconductor modules 21 is joined.

The extending portion of each of the positive and negative busbars 4P and 4N exposed from the potting surface 311 of the seal resin filler 31 has a pair of opposing first and second sides in the X direction.

Each of the positive and negative busbars 4P and 4N is comprised of the power-source connection portion 41 protruding from the first side of the extending portion thereof in the X direction.

The power-source connection portion 41 of the positive busbar 4P and the power-source connection portion 41 of the negative busbar 4N are arranged to be adjacent to each other in the Y direction as viewed in the Z direction.

As illustrated in FIG. 5, the power converter 1 includes cooling pipes 51. The semiconductor modules 2, which constitute the semiconductor stack 11, and the cooling pipes 51 are alternately stacked in the X direction. That is, the semiconductor stack 11 is configured such that the semiconductor modules 2 and the cooling pipes 51 are alternately stacked in the X direction. In other words, each of the semiconductor modules 2, which has opposing first and second major sides in the X direction, is sandwiched between a corresponding adjacent pair of cooling pipes 51. This enables heat in each semiconductor module 2 to be dissipated from the first and second major sides through the corresponding adjacent pair of cooling pipes 51. The stacked cooling pipes 51 in the X direction constitute a cooling unit 5 for cooling the semiconductor modules 2. Each of the cooling pipes 51 includes a coolant flow channel through which a predetermined refrigerant, i.e., a coolant, flows.

Each of the cooling pipes 51 has opposing first and second ends in its longitudinal direction, i.e., the Y direction.

The cooling unit 5 includes a plurality of joint pipes 52. The joint pipes 52 include first joint pipes communicably connecting the first ends of the cooling pipes 51, and second joint pipes communicably connecting the second ends of the cooling pipes 51.

The cooling unit 5 also includes a coolant inlet 531 and a coolant outlet 532. The coolant inlet 531 is communicably joined to the first end of, for example, the rightmost cooling pipe 51 in FIG. 5, and the coolant outlet 532 is communicably joined to the second end of the rightmost cooling pipe 51 in FIG. 5.

When a predetermined refrigerant, i.e. a coolant, is introduced into the coolant inlet 531, the coolant flows into all the cooling pipes 51 from their first ends via the first joint pipes 52, and reaches the second ends of all the cooling pipes 51. Thereafter, the coolant flows through the second joint pipes 52 to be exhausted from the coolant outlet 532. This enables the coolant flowing through each cooling pipe 51 and the semiconductor modules 2 to perform heat exchange therebetween, resulting in a part of heat generated from the semiconductor modules 2 being dissipated into the coolant.

As illustrated in FIG. 3, the power converter 1 includes a power conversion unit constituted by the three semiconductor modules 2, each of which is comprised of a pair of switching devices connected in series. That is, the three semiconductor modules 2 serves respectively as legs of the power conversion unit.

The power conversion unit of the power converter 1 converts DC power supplied from the DC power source BAT into AC power, and supplies the AC power to an AC load MG, such as a three-phase AC motor that can serve as a power generator. That is, when regenerative AC power generated by the AC load MG is converted into regenerative DC power by the power conversion unit, and the regenerative DC power is charged in the DC power source BAT.

An assembly comprised of the capacitor elements 3 is electrically connected between the DC power source BAT and the power conversion unit. The assembly of the capacitor elements 3 is configured to eliminate ripple current components included in an output current from the DC power source BAT, and supply the output current, from which the ripple current components, have been removed to the power conversion unit as a direct current.

The assembly of the capacitor elements 3 is also configured to eliminate ripple current components included in a regenerative current of the regenerative DC power supplied from the power conversion unit, and supply the regenerative current, from which the ripple current components have been removed, to the DC power source BAT.

Alternating-current (AC) components, such as ripples, flow through the capacitor elements 3, but a direct current hardly flows through the capacitor elements 3. For this reason, each of the second current paths, i.e., the current-flow paths, 402 connected between the positive element connection portion 42 and the power-source connection portion 41 enables an alternating current to flow therethrough, but a direct current not to flow therethrough.

In contrast, a direct current flows between the DC power source BAT and the semiconductor modules 2, so that a direct current flows through each of the first current paths, i.e., the current-flow paths, 401 between a corresponding one of the terminal connection portions 43 and the power-source connection portion 41. In addition, an alternating current flows between the assembly 3 of the capacitor elements 3 and the semiconductor modules 2.

The magnitude of a direct current flowing through the busbar 4 is larger than the magnitude of an alternating current flowing through each of the busbars 4P and 4N. For this reason, each first current path 401 through which a direct current flows is likely to generate a large amount of Joule heat due to the direct current. This results in each first current path 401 itself and its surrounding in each busbar 4 being likely to have a high temperature. Although the semiconductor modules 2 are likely to have a high temperature, the semiconductor modules 2 are cooled by the cooling unit 5, making it possible to restrict or suppress an increase in temperature of the semiconductor modules 2.

In contrast, a relatively large amount of heat is not generated from each second current path 402 through which an alternating current flows.

Unfortunately, the heat generated from each first current path 401 may be transferred through a portion of each busbar 4 to the capacitor elements 3; the portion is located around each second current path 402. For this reason, if the thermal resistance of each second current path 402 were lower than that of each first current path 401, the heat transferred from each first current path 401 would increase the temperature of each capacitor element 3.

From this viewpoint, the power converter 1 of the first embodiment is configured such that the thermal resistance of each second current path 402 is higher than that of each first current path 401. This enables transfer of heat generated from each first current path 401 to the capacitor elements 3 to be inhibited.

Setting the thermal resistance of each first current path 401 to be lower than that of each second current path 402 enables the electrical resistance of each first current path 401 to be lower than that of each second current path 402. This makes it possible to reduce the amount of Joule heat generated from each first current path 401. This therefore enables transfer of heat generated from each first current path 401 to the capacitor elements 3 to be restricted as much as possible.

FIG. 3 illustrates a circuit diagram of the power converter 1 according to the first embodiment. In the circuit diagram of FIG. 3, a current path indicative of one of the first current paths 401 and a current path indicative of each of the second current paths 402 are respectively illustrated by dashed lines.

The positive busbar 4P of the first embodiment is comprised of the three first current paths 401 each between the power-source connection portion 41 and a corresponding one of the positive power terminals 21 of the semiconductor modules 2. The three first current paths 401 have respectively different values of the thermal resistance from one another. Preferably, the values of the thermal resistance of the respective three first current paths 401 are set to be as low as possible.

The positive busbar 4P of the first embodiment is also comprised of the second current paths 402 each between the power-source connection portion 41 and a corresponding one of the capacitor elements 3. Preferably, the values of the thermal resistance of some of the first current paths 401 are set to be lower than the value of the thermal resistance of any of the second current paths 402. More preferably, the values of the thermal resistance of all the first current paths 401 are set to be lower than the value of the thermal resistance of any of the second current paths 402.

Additionally, the positive busbar 4P has a substantially uniform thickness in the Z direction. The length of at least one of the first current paths 401 of the positive busbar 4P is set to be shorter than that of any of the second current paths 402. Preferably, the lengths of some of the first current paths 401 of the positive busbar 4P are set to be shorter than that of any of the second current paths 402. More preferably, the lengths of all the first current paths 401 of the positive busbar 4P are set to be shorter than that of any of the second current paths 402.

Preferably, like the positive busbar 4P, the value of the thermal resistance of at least one of the first current paths 401 of the negative busbar 4N is set to be lower than the value of the thermal resistance of any of the second current paths 402. Like the positive busbar 4P, the negative busbar 4N is comprised of the first current paths 401 and the second current paths 402. The relationship between the thermal resistance of each first current path 401 and that of each second current path 402 of the negative busbar 4N can be set to be identical to that between the thermal resistance of each first current path 401 and that of each second current path 402 of the positive busbar 4P.

Specifically, the values of the thermal resistance of some of the first current paths 401 of the negative busbar 4N are preferably set to be lower than the value of the thermal resistance of any of the second current paths 402 of the negative busbar 4N. More preferably, the values of the thermal resistance of all the first current paths 401 of the negative busbar 4N are set to be lower than the value of the thermal resistance of any of the second current paths 402 of the negative busbar 4N.

Additionally, the lengths of some of the first current paths 401 of the negative busbar 4N are preferably set to be shorter than that of any of the second current paths 402 of the negative busbar 4N. More preferably, the lengths of all the first current paths 401 of the negative busbar 4N are set to be shorter than that of any of the second current paths 402 of the negative busbar 4N.

Next, the following describes features of the power converter 1 according to the first embodiment, and advantageous benefits achieved by the features of the power converter 1.

At least one of the positive busbar 4P and negative busbar 4N has at least one first current path 401 having the thermal resistance lower than that of any of the second current paths 402. Setting the thermal resistance of the at least one first current path 401 to be lower than that of any of the second current paths 402 enables the electrical resistance of the at least one first current path 401 to be lower than that of any of the second current paths 402.

This therefore enables a reduction in the amount of heat due to a direct current flowing through the at least one first current path 401. Additionally, the thermal resistance of each of the second current paths 402, which is higher than that of the a least one first current path 401, enables the amount of heat transferred from the at least one first current path 401 to each capacitor element 3 to be reduced, making it possible to restrict an increase in temperature of each capacitor element 3.

At least one of the positive busbar 4P and negative busbar 4N has at least one first current path 401 having a length shorter than that of any of the second current paths 402. This makes it possible to easily construct the power converter 1, which restricts an increase in temperature of each capacitor element 3. For example, if each busbar 4 has a substantially uniform thickness and is composed of one or more homogeneous materials, setting the length of at least one first current path 401 to be shorter than that of any of the second current paths 402 enables the above advantageous effects to be easily achieved.

At least one of the positive busbar 4P and the negative busbar 4N has the distance L1 of each of the terminal connection portions 43 from the reference first current path 401 in the lateral direction Y, and has the distance L2 of the positive terminal connector 42 from the reference first current path 401 in the lateral direction Y; the distance L1 is set to be shorter than the distance L2. This enables transfer of heat generated from the reference current path 401 of the common portion 44 to each capacitor element 3 to be efficiently inhibited, resulting in an increase in temperature of each capacitor element 3 being efficiently restricted.

At least part of each first current path 401 is exposed from the seal resin filler 31. This prevents heat from each first current path 401, which is likely to generate heat, from being filled in the seal resin filler 31, making it possible to restrict transfer of heat to each capacitor element 3.

As described above, the first embodiment offers a power converter that restricts an increase in temperature of each capacitor element 3.

Second Embodiment

Figure 9:
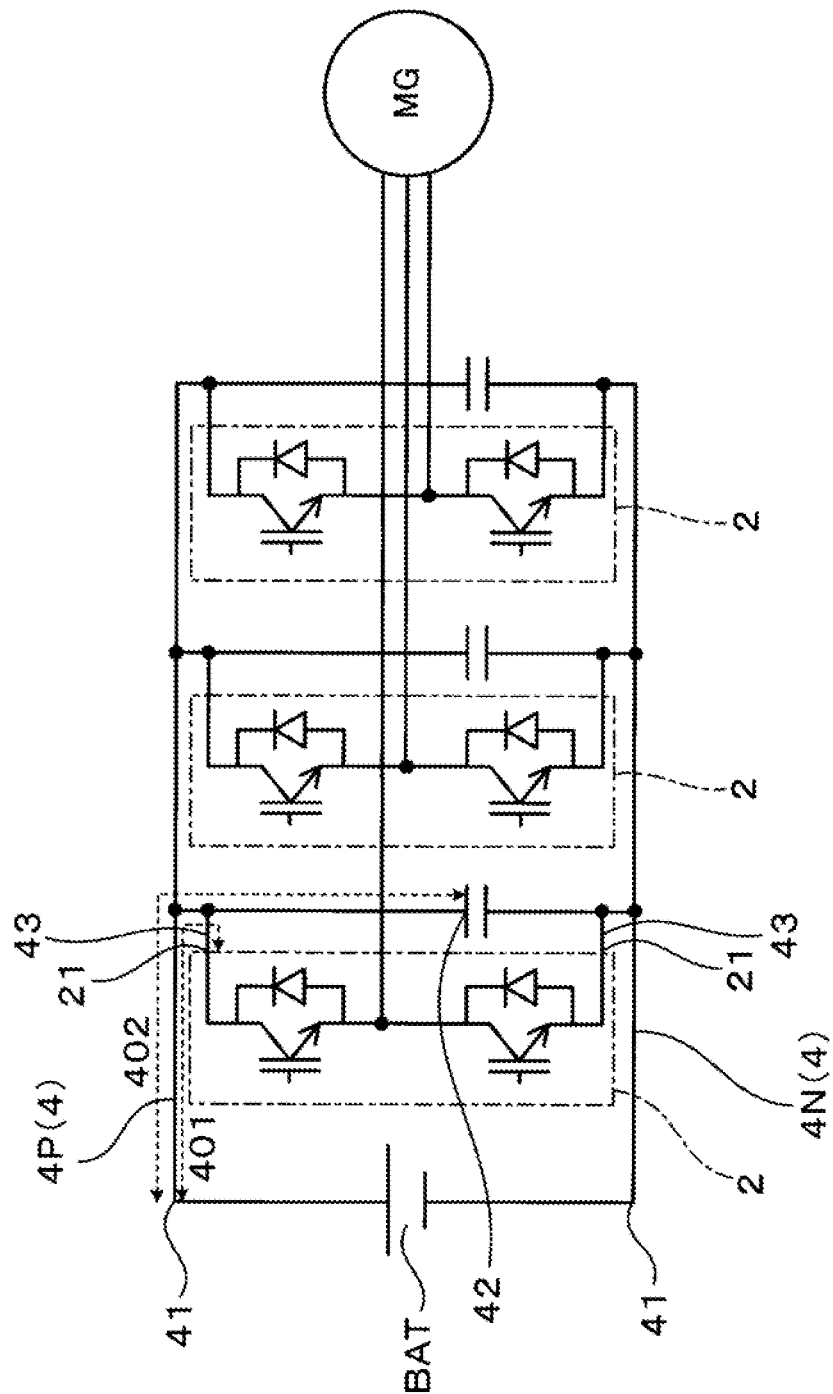
FIG. 9 is a circuit diagram of a power converter according to the second embodiment.
Figure 10:
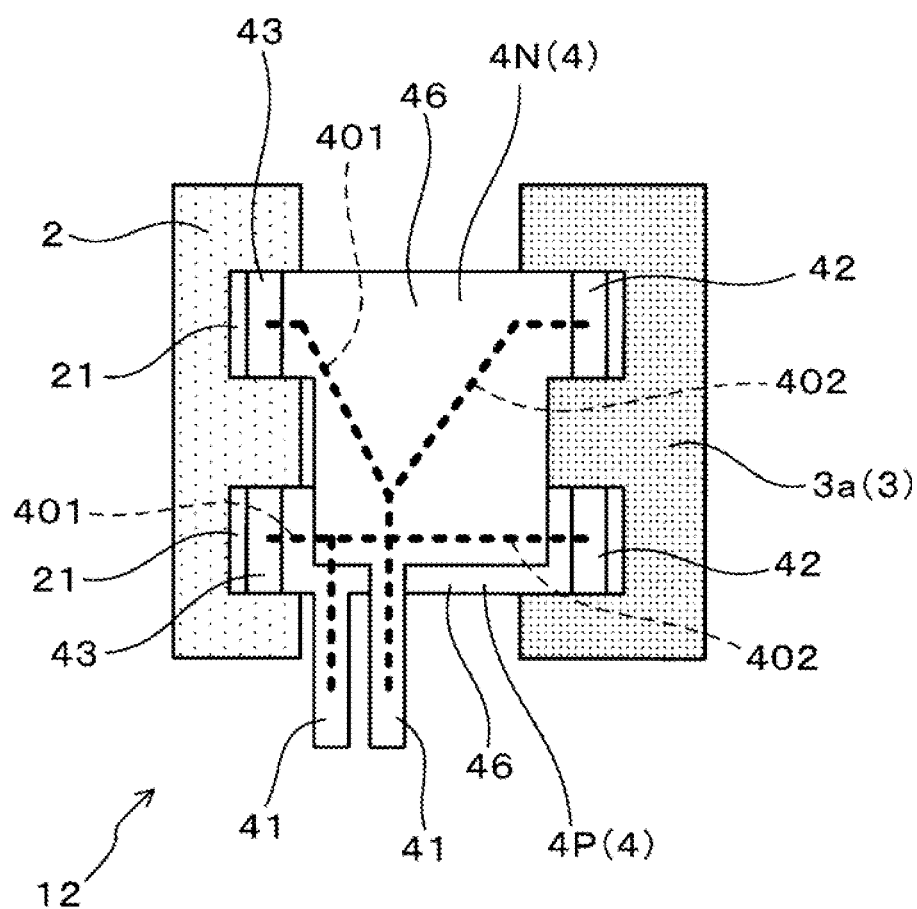
FIG. 10 is a plan view of a leg module according to the second embodiment.

The following describes the second embodiment of the present disclosure with reference to FIGS. 9 and 10.

The configuration of a power converter 1 of the second embodiment differs from that of the power converter 1 in that the capacitor elements 3 are connected in parallel to the respective semiconductor modules 2, i.e., the respective legs of the power conversion unit; the capacitor elements 3 will also be referred to as leg capacitors 3.

That is, the capacitor elements 3 of the second embodiment are connected in parallel to the respective series switch sections, each of which is comprised of the pair of upper- and lower-arm switching devices connected in series.

The power converter 1 of the second embodiment is configured such that at least one of the positive busbar 4P and negative busbar 4N of the power converter 1 of the second embodiment has at least one first current path 401 having the thermal resistance lower than that of any of the second current paths 402.

In particular, the power converter 1 of the second embodiment is specially configured such that each of the positive busbar 4P and negative busbar 4N has at least one first current path 401 having the thermal resistance lower than that of any of the second current paths 402.

FIG. 10 illustrates an example of the arrangement of one semiconductor module 2 and one capacitor module 3a comprised of one capacitor element 3, which establishes the above special configuration.

That is, one semiconductor module 2, one capacitor module 3a, and a pair of busbars 4 (positive busbar and negative busbar 4P and 4N) illustrated in FIG. 10 constitute one leg of the power conversion circuit. The above-configured leg will be referred to as a leg module 12.

The semiconductor module 2 and the capacitor module 3a are arranged to face each other, so that each of the positive and negative power terminals 21 faces a corresponding one of the positive and negative electrodes of the capacitor module 3a.

Each of the busbars 4 (4P, 4N) includes a connection portion 46 located between a corresponding one of the positive and negative power terminals 21 protruding from the semiconductor module 2 and a corresponding one of the positive and negative electrodes protruding from the capacitor module 3a.

The connection portion 46 of each of the busbars 4 (4P, 4N) includes the element connection portion 42 joined to the corresponding one of the positive and negative electrodes of the capacitor module 3a, and the terminal connection portion 43 joined to the corresponding one of the positive and negative power terminals 21 of the semiconductor module 2.

Each of the busbars 4 (4P, 4N) also includes the power-source connection portion 41 protruding from one side of the connection portion 46. The power-source terminal 41 of each of the busbars 4 (4P, 4N) is located between the element connection portion 42 and the terminal connection portion 43 to be closer to the terminal connection portion 43 than the middle of the one side of the connection portion 46, i.e., the middle of a virtual straight line connecting between the terminal connection portion 43 and the element connection portion 42.

The above arrangement enables (1) The length of the first current path 401 from the power-source terminal 41 of each of the busbars 4 (4P, 4N) to the terminal connection portion 43 thereof to be shorter than that of the second current path 402 from the power-source terminal 41 to the element connection portion 42

(2) The thermal resistance of the first current path 401 from the power-source terminal 41 of each of the busbars 4 (4P, 4N) to the terminal connection portion 43 thereof to be lower than that of the second current path 402 from the power-source terminal 41 to the element connection portion 42

In the circuit diagram of the power converter 1 according to the second embodiment in FIG. 9, a current path indicative of the first current path 401 of each of the positive and negative busbars 4P and 4N and a current path indicative of the second current path 402 of each of the positive and negative busbars 4P and 4N are respectively illustrated by dashed lines.

As descried above, FIG. 10 illustrates only the leg module 12 for one leg of the power conversion circuit, but the power converter 1 of the second embodiment is comprised of at least three leg moguls 12 for the three legs of the power conversion circuit. That is, the power converter 1 of the second embodiment, which aims to drive the three-phase AC load MG, includes the at least three leg modules 12 for the respective three phases. Each of the three leg modules 12 preferably has the same configuration illustrated in FIG. 10. This modification enables (1) The length of each of the first current paths 401 from the power-source terminal 41 of a corresponding one of the busbars 4 (4P, 4N) to the terminal connection portion 43 thereof to be shorter than that of the second current path 402 from the power-source terminal 41 to the element connection portion 42 of a corresponding one of the busbars 4 (4P, 4N)

(2) The thermal resistance of each of the first current paths 401 from the power-source terminal 41 of a corresponding one of the busbars 4 (4P, 4N) to the terminal connection portion 43 thereof to be lower than that of the second current path 402 from the power-source terminal 41 to the element connection portion 42 of a corresponding one of the busbars 4 (4P, 4N)

The power-source terminals 41 of each leg module 12 can be connected to the respective positive and negative terminals of the DC power source BAT via another busbar that is not illustrated in FIG. 10.

Elements or components described in the second embodiment, whose reference characters are identical to elements or components described in the first embodiment, are identical to the elements or components described in the first embodiment.

The present disclosure is not limited to the above embodiments, and therefore can be applied to various types of embodiments within the scope of the present disclosure.

The present disclosure of the specification described in conformity with the first and second embodiments is not limited to the embodiments or configurations described in the embodiments. The present disclosure can include not only the embodiments but also various modifications and/or changes within the scope or its equivalent of the present disclosure. Various combinations or various configurations are included within the scope of the present disclosure.

What is claimed is:

1. A power converter comprising:
   at least one semiconductor module that has a power terminal and is electrically connected to a direct-current power source;
   a capacitor element electrically connected to the at least one semiconductor module;
   a positive busbar arranged to electrically connect between the direct-current power source and the at least one semiconductor module;
   a negative busbar arranged to electrically connect between the direct-current power source and the at least one semiconductor module,
   the capacitor element and the at least one semiconductor module being physically connected to one another through only the positive busbar and the negative busbar;
   a cooling unit configured to cool the at least one semiconductor module,
   the at least one semiconductor module and the cooling unit being stacked in a predetermined stack direction to constitute a semiconductor stack, and
   the capacitor element being disposed to be separated from the semiconductor stack in a lateral direction perpendicular to the predetermined stack direction, wherein:
   each of the positive busbar and the negative busbar extends in the lateral direction perpendicular to the predetermined stack direction away from the semiconductor stack;
   only the positive busbar and the negative busbar constitute a direct thermal transfer path between the at least one semiconductor module and the capacitor element;
   each of the positive busbar and the negative busbar comprises:
     a power-source connection portion electrically connected to the direct-current power source;
     an element connection portion electrically connected to the capacitor element;
     at least one terminal connection portion electrically connected to the power terminal of the at least one semiconductor module;
     a first current path that is located away from the semiconductor stack and has a first thermal resistance and is a current flow path between the power-source connection portion and the at least one terminal connection portion; and
     a second current path that is located away from the semiconductor stack and has a second thermal resistance and is a current flow path between the power-source connection portion and the element connection portion; and
   the first thermal resistance of the first current path of at least one of the positive busbar and the negative busbar being lower than the second thermal resistance of the second current path of the at least one of the positive busbar and the negative busbar.

2. The power converter according to claim 1, wherein:
   the first current path of each of the positive busbar and the negative busbar has a first length;
   the second current path of each of the positive busbar and the negative busbar has a second length; and
   the first length of the first current path of the at least one of the positive busbar and the negative busbar is shorter than the second length of the second current path of the at least one of the positive busbar and the negative busbar.

3. The power converter according to claim 1, wherein:
   the at least one semiconductor module comprises a plurality of semiconductor modules, the plurality of semiconductor modules being stacked in the predetermined stack direction to constitute a semiconductor stack;
   the at least one terminal connection portion comprises a plurality of terminal connection portions;
   each of the positive busbar and the negative busbar comprises:
     a common portion constitutes at least part of the first current path and at least part of the second current path; and
     a plurality of branch portions that branch from the common portion and respectively include the terminal connection portions; and
   each of the positive busbar and the negative busbar has:
     a first distance of each of the terminal connection portions from the at least part of the first current path of the common portion in the lateral direction; and
     a second distance of the terminal connection portion of each of the semiconductor modules from the at least part of the first current path of the common portion in the lateral direction; and
   the first distance of the at least one of the positive busbar and the negative busbar is shorter than the second distance of the at least one of the positive busbar and the negative busbar.

4. The power converter according to claim 2, wherein:
   the at least one semiconductor module comprises a plurality of semiconductor modules, the plurality of semiconductor modules being stacked in the predetermined stack direction to constitute a semiconductor stack;
   the at least one terminal connection portion comprises a plurality of terminal connection portions;
   each of the positive busbar and the negative busbar comprises:
     a common portion constitutes at least part of the first current path and at least part of the second current path; and
     a plurality of branch portions that branch from the common portion and respectively include the terminal connection portions; and
   each of the positive busbar and the negative busbar has:
     a first distance of each of the terminal connection portions from the at least part of the first current path of the common portion in the lateral direction; and
     a second distance of the terminal connection portion of each of the semiconductor modules from the at least part of the first current path of the common portion in the lateral direction; and
   the first distance of the at least one of the positive busbar and the negative busbar is shorter than the second distance of the at least one of the positive busbar and the negative busbar.

5. The power converter according to claim 1, further comprising:
   a resin package in which a part of the at least one of the positive busbar and the negative busbar is filled in the resin package, a remaining part of the at least one of the positive busbar and the negative busbar being exposed from the resin package.

6. The power converter according to claim 2, further comprising:
   a resin package in which a part of the at least one of the positive busbar and the negative busbar is filled in the resin package, a remaining part of the at least one of the positive busbar and the negative busbar being exposed from the resin package.

7. The power converter according to claim 3, further comprising:
   a resin package in which a part of the at least one of the positive busbar and the negative busbar is filled in the resin package, a remaining part of the at least one of the positive busbar and the negative busbar being exposed from the resin package.

8. The power converter according to claim 4, further comprising:
   a resin package in which a part of the at least one of the positive busbar and the negative busbar is filled in the resin package, a remaining part of the at least one of the positive busbar and the negative busbar being exposed from the resin package.

9. The power converter according to claim 1, wherein:
   the at least one terminal connection portion electrically connected to the power terminal of the at least one semiconductor module is directly connected to the power terminal of the at least one semiconductor module.

* * * * *